United States Patent [19]

Cupp et al.

[11] 3,838,445

[45] Sept. 24, 1974

[54] EVENT RECORDING SYSTEM

[75] Inventors: Frederick B. Cupp; Gary Van Camp, Rochester, both of N.Y.

[73] Assignee: EDMAC Associates Inc., Rochester, N.Y.

[22] Filed: May 29, 1973

[21] Appl. No.: 364,606

Related U.S. Application Data

[63] Continuation-in-part of Ser. No. 140,356, May 5, 1971, abandoned.

[52] U.S. Cl. .................................... 360/18, 360/32

[51] Int. Cl. ............................................ G11b 5/02

[58] Field of Search ........... 179/100.2 MD, 100.2 R, 179/100.1 VC; 346/74 M, 33 M, 34, 14 MR; 340/413; 360/32, 6, 49, 18

[56] References Cited

UNITED STATES PATENTS

| | | | |
|---|---|---|---|
| 3,581,014 | 5/1971 | Vogel | 179/100.1 VC |
| 3,588,375 | 6/1971 | Martin | 179/100.1 VC |
| 3,660,616 | 5/1972 | Davidge | 170/100.2 MD |

*Primary Examiner*—Bernard Konick

*Assistant Examiner*—Jay P. Lucas

[57] ABSTRACT

Apparatus is disclosed wherein analog signals produced by a plurality of sensors are multiplexed and applied to an analog to digital converter wherein each analog signal is converted to a digital word signal. The apparatus further includes circuitry which is responsive to the digital word signals when any one of such signals represents the amplitude of an analog signal above a selected value for causing a tape transport mechanism to be energized.

3 Claims, 2 Drawing Figures

EVENT RECORDING SYSTEM

BACKGROUND OF THE INVENTION

This is a continuation in part of U.S. Pat. Application Ser. No. 140,356 filed May 5, 1971, now abandoned.

The present invention relates to apparatus for recording analog data in a digital format which facilitates the decoding of the data.

DESCRIPTION OF THE PRIOR ART

Heretofore, recording of analog data has often been accomplished by subcarrier techniques, especially when it is desired to record the amplitude of the analog signal with a high degree of accuracy. FM subcarrier techniques permit a system response down to DC. When the system deviation and linearity are carefully controlled, the accuracy of this method of recording often renders it more desirable than direct analog recording. Moreover, for relatively short term applications where calibration is possible, FM and carrier techniques are quite adequate. However, when it is necessary to acquire data over an extended time period, problems of drift in the subcarrier oscillator signal can seriously degrade the accuracy of the recorded signal. For applications involving several months of recording, often a user will have to calibrate the subcarrier oscillators on a rather frequent basis. Another problem associated with FM subcarrier recording techniques is that in a severe vibrational environment, there may be induced wow and flutter in the recorded signal. This in turn requires the recording of an additional calibration track to remove these vibration induced variations.

SUMMARY OF THE INVENTION

Accordingly, it is an object of this invention to provide a recorder which does not require the use of FM subcarrier techniques. A further object of this invention is to provide a long recording time high capacity recorder.

A still further object is to provide a data recorder which may be directly coupled to a digital computer.

A still further object is to provide a data recorder which will rapidly start up and be adapted for burst or batch recording.

Another object of the invention is to employ digital techniques for recording analog data with reduced system complexity and user adjustments and permit high system stability since there will be no drift as usually associated with "purely" analog or subcarrier recorders.

A still further object is to provide a recording system having an improved time base error capability.

In the disclosed embodiment of the invention there is provided a data recorder system which receives analog signals produced by sensors, a multiplexer responsive to the analog signals and which applies a multiplexed signal to an analog to digital converter which produces digital words comprised of bits. Each word is associated with an analog signal and represents the amplitude of the corresponding analog signal. Detector means monitor the digital output of the analog to digital converter and when the value of a digital word is above some threshold level, it produces an output signal. The system further includes means responsive to the output signal for energizing a tape transport mechanism to start recording of digital words and means further responsive to the output signal to operate the analog to digital converter at a lower rate than the rate used in the search mode of operation.

A feature of the invention is the provision of a shift register in such an arrangement to prevent the loss of data during the time interval between when the detector means produces its output signal and the tape transport mechanism is accelerated up to operating speed.

Further and other objects and advantages will become more apparent in the detailed description of the preferred embodiment presented below.

DESCRIPTION OF THE PREFERRED EMBODIMENT

A preferred embodiment of the invention is disclosed in connection with a data recorder system 10. For the sake of clarity, many of the details of the system 10 have been omitted but their operation will be appreciated by those skilled in the art.

Figure 1:
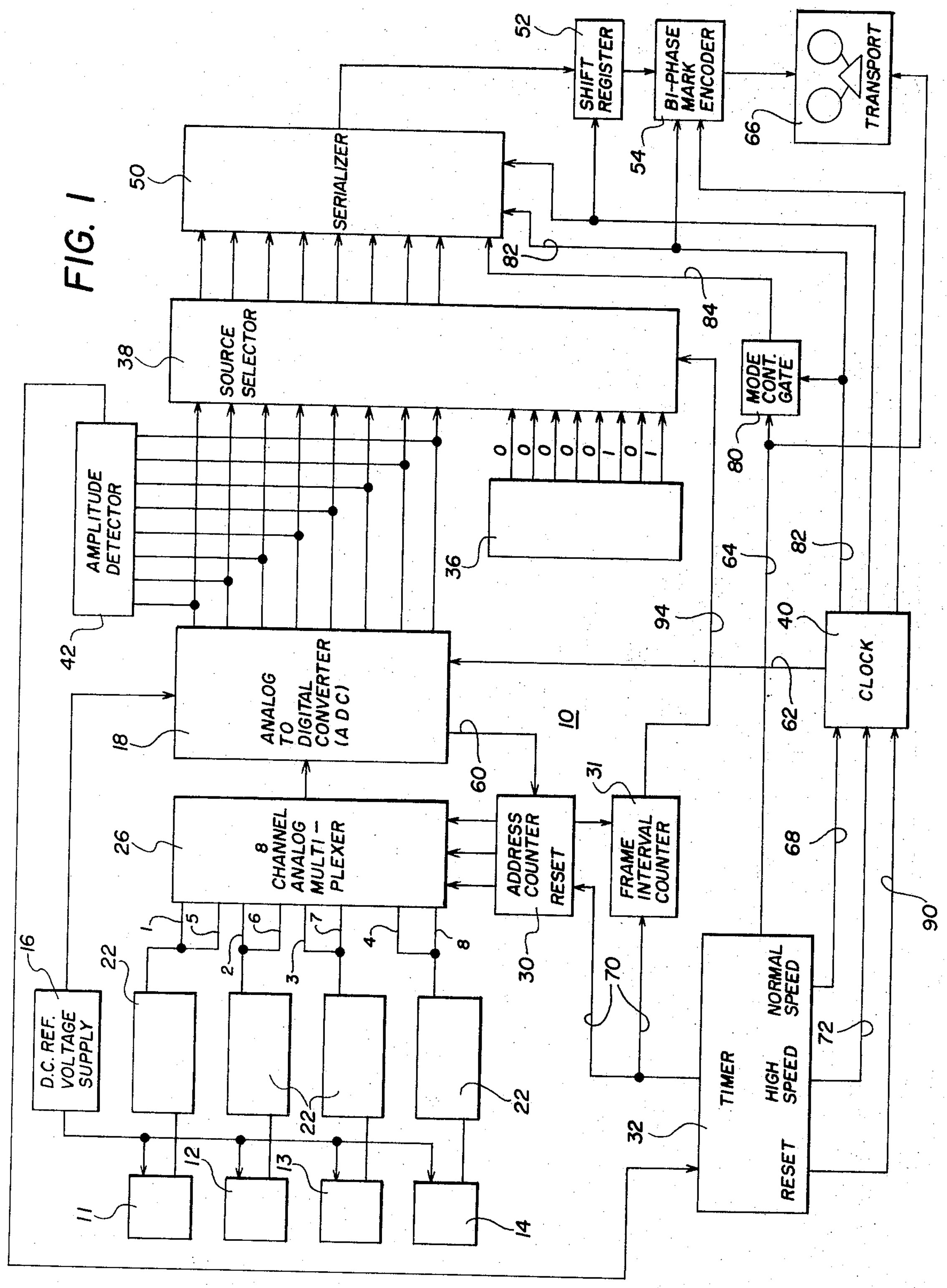
FIG. 1 is a block diagram of a data recording system embodying the present invention.

In FIG. 1, a functional block diagram of a recording system 10 in accordance with the present invention is shown. Analog signals are each produced by one of a series of sensor devices 11–14. The sensor devices 11–14 may, for example be strain gauges which monitor different parts of a motor as it is operated or gauges which monitor the operation of the human heart. Thus it should be appreciated that apparatus in accordance with the invention can be used in a multitude of applications. The guages 11–14 receive a source of DC reference potential from a supply 16 which also applies a reference DC potential to an analog to digital converter 18, hereinafter called the ADC 18. Due to the low signal level at the output of the strain gauges 11-14, it is necessary to provide approximately 60db of gain to raise a gauge analog signal to a value approaching the range wherein the ADC 18 may be effectively operated. Although not shown in detail, those skilled in the art will appreciate that the blocks 22 contain circuitry which provides the 60db of gain. Such circuitry may include two signal conditioning cascaded operational amplifiers, with active low pass networks in the feedback loops of each of the operational amplifiers. By such an arrangement, any high frequency noise which might be introduced into the input signal by say engine electrical accessories within the vehicle will be removed. An adjustable gain control circuit may also be included in the signal conditioning amplifiers.

Each output of the signal conditioning amplifiers 22 is applied as an input to an eight channel multiplexer 26 whose operation will be well understood to those well skilled in the art. The multiplexer 26 has pairs of channels wired together in such a manner that the multiplexer will sample the channels in an ascending order, namely in the following sequence: 1, 2, 3, 4, 5, 6, 7, 8. Thus channels 1 and 5 are wired together, as are the following channels 2 and 6, 3 and 7, and 4 and 8. The eight channel capability might also be advantageously used if it is desired to include a larger number of sensors than the four shown. By paralleling the input channels in the manner described, the eight channel analog multiplexer 26 actually performs as a four channel multiplexer. The selection of one of the four channels by the analog multiplexer 26 is achieved by a digital address generated in an address counter 30 shown adjacent the multiplexer 26. The counter 30 is stepped to a new address at the conclusion of every digital conversion cycle of the ADC 18 by energization of line 60 by the ADC 18. The ADC 18 produces a digital output word signal having eight digital bits, with each bit provided over a particular one of 8 lead lines. Each digital word corresponds to the amplitude of the analog signal included on the channel selected by the multiplexer 26. The counter 30 steps the multiplexer 26 to a new address causing it to sample the next channel at the conclusion of the digital conversion cycle of the ADC 18, which in turn is controlled by a clock pulse over an output lead line 62 of a clock 40 as will be described in more detail later. The recorder system 10 is initially commanded to begin recording by application of an output signal to a timer circuit 32 from an amplitude detector circuit 42. The timer circuit immediately applies a reset signal over line 90 to the clock 40 and over line 70 to the address counter 30 and a frame interval counter 31. The counter 30 will be forced to a predetermined address, for example channel 1. It will advance a count of one, each time the lead 60 is energized thus the operating sequence of the multiplexer 26 is always known. The counter 31 is used to count a frame word interval which for the sake of convenience of this disclosure will be taken at 128 words and cause insertion of a particular character, hereinafter called the frame character word to be applied from a matrix 36 to a selector circuitry 38 to identify the beginning of a data block, comprised of a predetermined number of words. The frame character is inserted at specific intervals throughout the recording cycle. The frame character has the binary designation shown on the drawing: 00000101 and is used to facilitate synchronization of a playback system for decoding data recorded on a tape as will be appreciated by those skilled in the art.

The output of the analog multiplexer 26 is applied to the input of the ADC 18. The ADC 18 may be a conventional model such as that manufactured by the Phoenix Data, Inc. The amplitude of the analog signal to the ADC is converted to binary form and provided over eight output lines as previously described. The technique of successive approximation is used and provides a binary representation (a data word) of the amplitude of an analog signal applied over a selected one of the channels 1–8 to the multipler 26. As will be appreciated by those skilled in the art, the amplitude of the analog input signal may be converted by a number of other techniques such as by means of parallel conversion. The conversion cycle of the ADC 18 is initiated by a start signal provided over line 62 from the clock 40 which is adapted to provide signals to other circuits. Clock 40 continuously operates and provides signals to the timer 32 at a normal or recording speed rate over line 68 and at a high or search speed rate over line 72. The clock 40 also provides periodic signals to a mode control gate 80 over line 82 and also to a serializer 50 over lines 82 and 88. Line 88 also is coupled to a shift register 52 and lines 78 and 82 are coupled to the bi-phase mark encoder 54. Upon completion of the conversion cycle of the ADC 18 the eight bit digital word representation of the amplitude of the analog signal appearing at the eight output lines of the ADC 18 is received by ths source selector 38. Because of the timing signals over leads 82 and 88 to the serializer 50, the serializer shifts the bits of the digital word into a shift register 52. At this time the conversion is completed and a pulse over line 60 from the ADC 18 provides a signal to advance the address counter 30 which in turn sequences the multiplexer 26 to the next input channel. More specifically, the eight parallel outputs of the ADC 18 are sustained until the next command signal provided by line 62. The amplitude detector 42 is adapted to detect and provide a signal to the timing circuit when any input signal from the strain gauges 11–14 exceed a predetermined level for example, of this disclosure only, 10 percent of its expected maximum value. In the past, usually two analog comparators were used for each input channel to determine whether a predetermined amplitude level was exceeded. Thus, the use of the amplitude detector 42 provides advantage over prior arrangements.

The amplitude detector 42 uses a digital sensing method which may consist of five logic gates and which eliminates redundant analog devices and requires no calibration as would prior analog comparators.

In the search mode the tape transport mechanism 66 is not running, and the analog multiplexer 26 and the ADC 18 are under the control of the high speed clock signal applied over line 62 by the clock 40. The signals applied over line 62 may be 25 times the rate of speed of the signal applied over line 62 when at the normal speed of the recorder system 10. The timer 32, controls the operation of the clock via lines 68 and 72 to cause the clock to produce pulses at either the high speed search rate, or the normal low speed recording rate. The amplitude detector 42 monitors the output of the ADC 18 and if the value of a signal is greater than 10 percent of the maximum amplitude, the detector provides the signal to the timer 32 which in turn provides the following operations:

(1) energizes the transport mechanism 66 by energizing line 64 for a predetermined period of time, say for example, five seconds; (2) energizes the low or normal speed line 68 from the clock 40; (3) resets the counter 31 and the address counter 30 by energizing line 70. The counter 31 applies a signal over line 94 to the source selector 38 which causes it to insert a frame word, from a matrix device, 36. The frame word is inserted in lieu of the data word representing channel 1. Thereafter, the input channels are examined in the following order: 2, 3, 4, 1, 2, 3, 4, and so forth.

If the amplitude detector 42 continues to detect a signal level greater than the 10 percent value while the transport 66 is running, the timer 32 will again receive an input signal which in turn causes the timer 32 to continue to accept the signals over the lead line 68 without shifting to a search mode of operation and the transport 66 will be operated until five seconds after the last signal from the detector 42. At that time the timer 32 turns off the transport and selects the high speed clock line 72 which initiates the search mode. The tape transport mechanism 66 may take many forms well known in the art which would include cartridge, cassette or reel to reel mechanisms. Further, although not shown, it of course operates in conjunction with any suitable transducer for conversion of recorded data, i.e. magnetic flux, into an electrical signal. An example is the electromagnetic record-reproduce head of a tape recorder. Still further, those skilled in the art will appreciate that discs, drums, cards, and other apparatus which uses a medium to record data may also practice the invention.

The selector 38, may be considered as analgous to an eight pole-two position gang switch. The normal postion of this switch permits the passage of the eight lines of digital data from the ADC 18 through the source selector 38 into the serializer 50. After serialization, the single line of serial binary data is entered into shift register 52. At intervals of 128 words as is determined by the frame word intervals counter 31, the source selector 38 is ordered to ignore one word of data from the analog to digital converter and permit a frame word from the matrix 36 to be inserted into the serializer 50.

The serializer 50 is adapted to accept the eight bits of digital data provided at the output of the source selector 38 and then includes a shift register (not shown) which has an eight bit capacity and is adapted to shift data bits one by one to provide a serializing function. Thus, bits appear one after the other rather than all simultaneously at the output of the serializer 50, which provided as an input to the shift register 52. The mode control circuit 80 receives an input signal from the timer 32 over line 64 and from a clock 40 over a line 82 and provides an output only if the clock provides a signal on both these lines. The mode control signal applied over lines 84 to the serializer 50 causes data to be shifted from the serializer 50 to shift register 52. The lines 82 and 88 also provide information to the serializer which permit it to accept and properly sequence the eight data bits into the shift register in a proper time sequence.

The digital shift register 52 may be comprised of several medium scale integrated circuits of the metal oxide silicon semi-conductor type, each of which has 200 bit storage capacity. The data from the serializer 50 is entered into one end of the shift register 52 and is shifted progressively along through each of the shift registers at the normal recording data rate provided by the signal over line 88. As a result, there will be a delay between the time an analog signal is produced by one of the sensors and the binary equivalent word is actually delivered to the bi-phase mark encoder 54. The purpose of this delay is to permit the tape transport mechanism 66 sufficient time to accelerate to its normal operating speed before data are recorded. Thus, the shift register 52 provides a function which will prevent the loss of data due to the acceleration time of the transport mechanism 66 as is often found in prior mechanisms.

The encoder mechanism 54 may be any one of a number of conventional forms, however, it is found desirable to employ a bi-phase mark encoder for translating the normal binary data to a new format which has several advantages for tape recording. One of these advantages is the limitation in the frequency spectrum in the encoded data as compared to the normal data. A non-return to zero recording system (NRZ) has components which extend from the bit rate down to and including DC. The output of the bi-phase mark encoder on the other hand, is composed primarily of two frequencies which are harmonically related, thereby facilitating recording. Returning to the clock 40, it may include a basic quartz crystal oscillator. The output of the quartz crystal can be divided down in a number of steps by digital techniques well understood to provide the various frequencies and time intervals necessary to synchronize the operations of the system 10 as it has been described.

Returning to the timer 32, when amplitude threshold exceeds the preset value, the signal from the amplitude detector 42 activates the timer and switches the system 10, to the record mode of operation generating a reset pulse to the frame address counter 30 and counter 31 to initiate a frame word insertion in the data stream through the source selector 38. If the amplitude detector 42 continues to energize the timer 32, after every 128 pulses, the counter 31 energizes lead 94 causing the insertion of a frame word. The mode control 80 is also operated by the time pulses over line 64 and is adapted to enable the passage of a pulse to the serializer 50 thus enabling the first data word to be inserted into the serializer 50. In this process, the frame character word is the first word to be inserted into the serializer and will be immediately recognized in the play-back process, since there is no random data appearing in the data stream prior to the frame character. Thus, with the first character being frame character, synchronization in the play-back process will be immediate.

Briefly reviewing the operation of the system 10, analog data produced by the sensors 11–14 are amplified and conditioned by circuitry 22 and applied to a multiplexer 26 over eight channels. The multiplexer selects one of the channels and applies it to an ADC converter 18 which produces a data word representative of the amplitude of the analog signal provided on one of the several channels. When the data word at the output of the ADC is above some predetermined level, the amplitude detector 42 provides a signal to the timer 32 which initiates a process causing the tape transport mechanism 66 to begin to operate and thereby record data.

A feature of the invention is that when not recording, the system 10 is adapted to operate in a search mode which is at a much higher rate than in the normal recording mode.

Another feature of the disclosed invention is that the storage of data in a shift register 52 prevents the loss of said data during the time required to accelerate the transport mechanism 66 up to operating speed and another feature is the digital means used to recognize when an analog signal level is above a selected level which eliminates problems of stability and provides a rapid, near instantaneous assessment of signal level.

Figure 2:
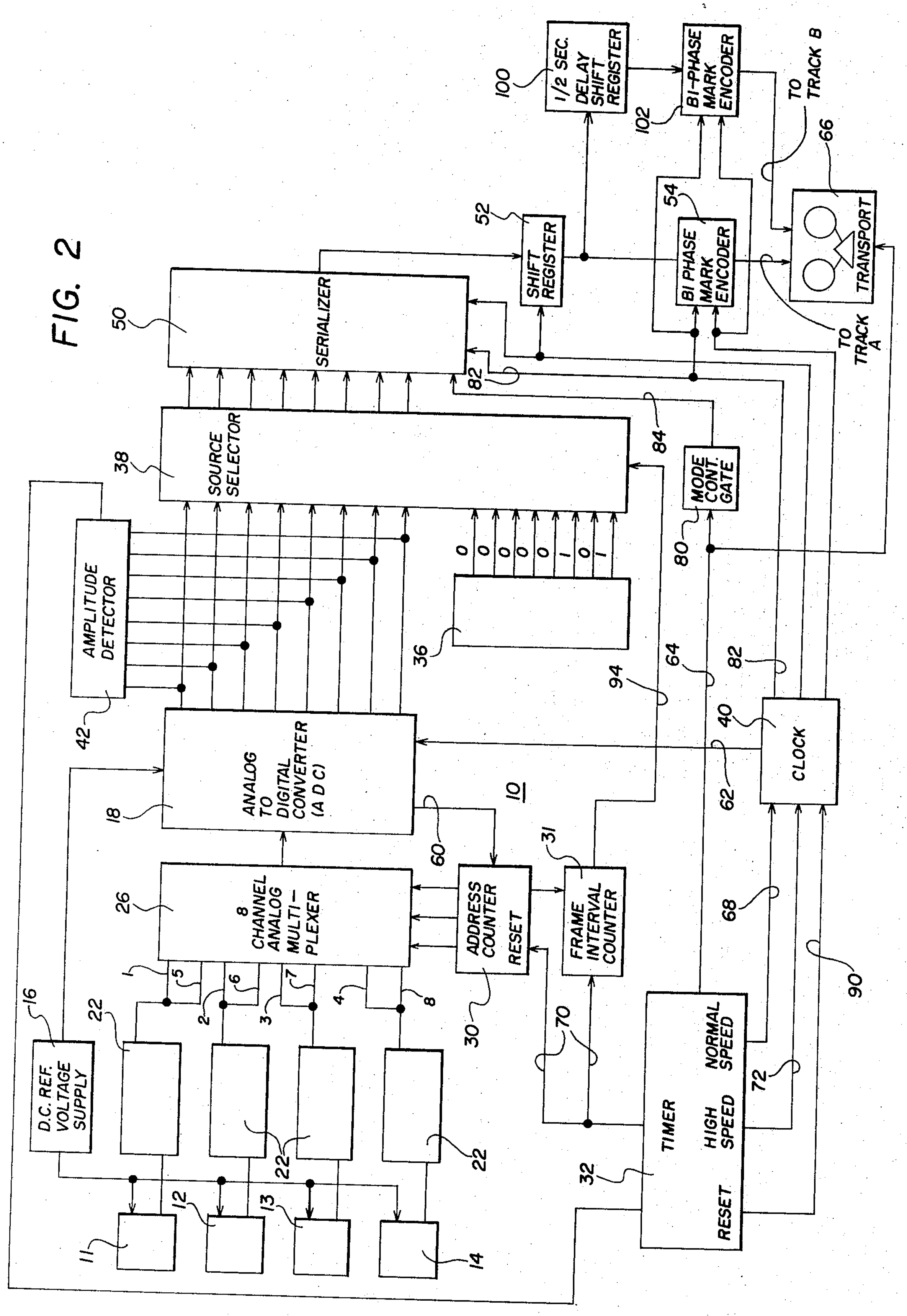
FIG. 2 is a block diagram of another embodiment of the invention.

Turning now to FIG. 2, there is shown another embodiment of the invention. Where the blocks correspond to those in FIG. 1, they have the same numerals. Further since the operation is the same as FIG. 1, they need not be discussed further. Before discussing the new blocks of FIG. 2, some further background will be given.

Vibration induced errors in tape recording when logging analog data in digital form limits the utility of the logging system. For example, test in a R.R. boxcar show that often the interruption to the data is short lived, existing only during certain combinations of G forces in several axes.

The present system of FIG. 2 contains a storage shift register 52 to preserve the data during startup. If this register 52 is increased in length, sufficient time storage could preserve the data during an initial impact. Some-times the error in data occurs later as a result of aftershocks, etc.

To provide a high degree of protection to the data, it is proposed to utilize a one-half second delay shift register 100 and record redundantly on two tracks of the tape via a second encoder 102. Track A will record the data prior to the one-half second delay, while track B will record the data after the delay. Enabling pulses are also delivered from clock 62 to encoder 102.

In this manner, the data will be preserved in the electronic storage during shocks which may wipe out track A, while track B will repeat the same data after the shock has subsided.

During playback, both tracks will be monitored for errors, track A will be delayed one-half second in a storage register to be coincident with track B. Data samples will then be taken from whichever track is free of error. Frame characters will be used to synchronize the two data streams via variable FIFO registers.

The invention has been described in detail with particular reference to a preferred embodiment thereof, but it will be understood that variations and modifications can be effected within the spirit and scope of the invention. Thus it will be understood that changes, alterations, modifications or substitutions can be made in the structure of apparatus in accordance with the invention without departing from the spirit and scope of the claims.

We claim:

1. In a data recording system, the combination comprising:

a. transport means effective when energized for moving a medium such as a disc or tape past a recording means, such as a recording head;

b. analog means for coupling first analog signals over a plurality of channels;

c. multiplexer means responsive to the first analog signals and to a specific control means for sequentially producing a second analog signal representative of one of the first signals;

d. an analog to digital converter responsive to the second analog signal for producing a digital word signal having a plurality of bits which is representative of the amplitude of the second analog signal;

e. detector means responsive to said digital word signal and effective in a first condition when said digital word signal indicates the second analog signal is below a pre-determined threshold level and effective in a second condition when said digital word signal indicates the analog signal is above the threshold level;

f. means responsive to the detector means in said first condition for producing address signals at a first rate; and responsive to said detector means in said second condition for producing address signals at a second rate and energizing the transport means;

g. encoding means coupled to said analog to digital converter responsive to the digital word for recording a digital representation on a first track of the medium representative of the digital word after said transport means is energized.

2. The invention as set forth in claim 1 wherein the system includes means for periodically inserting a frame character word to the encoding means for recording on the medium.

3. The invention as set forth in claim 2 above including a shift register coupled between said encoding means and said analog to digital converter for serially delivering the bits of a data word to the encoding means thereby delaying the process of recording the data bits by said recording means.

* * * * *